US012606232B2

(12) United States Patent
    Bae

(10) Patent No.: US 12,606,232 B2
(45) Date of Patent: Apr. 21, 2026

(54) DUST CAP FOR STEERING SYSTEM

(71) Applicant: HL MANDO CORPORATION,
    Pyeongtaek-si (KR)

(72) Inventor: Seunghyun Bae, Seongnam-si (KR)

(73) Assignee: HL MANDO CORPORATION,
    Pyeongtaek Si (KR)

( * ) Notice: Subject to any disclaimer, the term of this patent is extended or adjusted under 35 U.S.C. 154(b) by 335 days.

(21) Appl. No.: 18/222,165

(22) Filed: Jul. 14, 2023

(65) Prior Publication Data

US 2024/0157997 A1     May 16, 2024

(30)     Foreign Application Priority Data

Nov. 14, 2022     (KR) ........................ 10-2022-0151770

(51) Int. Cl.
    *B60R 13/08*     (2006.01)
    *B62D 1/20*     (2006.01)
    *B62D 3/12*     (2006.01)
    *B62D 5/04*     (2006.01)
    *F16J 15/02*     (2006.01)

(52) U.S. Cl.
    CPC     *B62D 1/20* (2013.01); *B62D 3/12* (2013.01)

(58) Field of Classification Search
    CPC .......... B60R 13/083; B62D 1/20; B62D 3/12;
                B62D 5/0403; B62D 5/0442; F16J 15/02;
                F16J 15/021; F16J 15/022
    USPC ........................................... 74/492
    See application file for complete search history.

(56)     References Cited

U.S. PATENT DOCUMENTS

| | | | | | |
|---|---|---|---|---|---|
| 8,469,428 | B1 * | 6/2013 | Tobey | ................. | B60R 21/0428 |
| | | | | | 296/146.7 |
| 2011/0074119 | A1 * | 3/2011 | Deane | ...................... | F16J 3/046 |
| | | | | | 277/637 |

FOREIGN PATENT DOCUMENTS

| | | | | | | |
|---|---|---|---|---|---|---|
| CN | 106004991 | A | * | 10/2016 | ............... | B62D 3/12 |
| CN | 220572113 | U | * | 3/2024 | | |
| EP | 1628313 | A2 | * | 2/2006 | ............... | H01F 7/06 |
| JP | 11-20742 | | | 1/1999 | | |
| KR | 0129049 | Y1 | * | 12/1998 | ............... | B62D 5/07 |
| KR | 10-0783755 | | | 12/2007 | | |
| KR | 20170112687 | A | * | 10/2017 | ............. | F16J 15/021 |
| KR | 10-1822596 | | | 3/2018 | | |
| KR | 10-2075049 | | | 2/2020 | | |

(Continued)

OTHER PUBLICATIONS

Description Translation for JP H1120742 A from Espacenet (Year: 1999).*

(Continued)

*Primary Examiner* — Jason D Shanske
*Assistant Examiner* — Daniel M. Keck
(74) *Attorney, Agent, or Firm* — LEE, HONG, DEGERMAN, KANG & WAIMEY

(57)     ABSTRACT

A dust cap for a steering system, the dust cap including a main body formed to provide an accommodation hole through which a shaft of the steering system passes, a bottom part disposed at an upper portion of the main body to support a dust packing to be in close contact with a vehicle part, and a vent member inserted into an opening at the bottom part, wherein the vent member is shaped to define a vent hole providing communication between an inner space of the bottom part and an outside of the vent member, and wherein a cross-sectional width of the vent hole gradually decreases along a downward direction.

20 Claims, 9 Drawing Sheets

(56)       References Cited

FOREIGN PATENT DOCUMENTS

KR       10-2020-0070751          6/2020
KR            20210124726  A   *  10/2021   ........  B60R 13/0846

OTHER PUBLICATIONS

Description Translation for KR 20200070751 A from Espacenet
(Year: 2020).*
Korean Intellectual Property Office Application No. 10-2022-
0151770, Office Action dated Mar. 31, 2025, 12 pages.

* cited by examiner

DUST CAP FOR STEERING SYSTEM

CROSS-REFERENCE TO RELATED APPLICATION

Pursuant to 35 U.S.C. § 119(a), this application claims the benefit of earlier filing date and right of priority to Korean Patent Application No. 10-2022-0151770, filed on Nov. 14, 2022, the contents of which are hereby incorporated by reference herein in its entirety.

BACKGROUND

Embodiments of the present disclosure relate to a dust cap for a steering system, and more specifically, to a dust cap for a steering system capable of preventing introduction of external foreign matter such as moisture while allowing an air flow between the inside and the outside of the dust cap of the steering system.

A steering system of a vehicle controls a travel direction of a vehicle body. In general, a steering system includes a steering wheel gripped and manipulated by a driver, a steering column which forms a rotary axis of the steering wheel and is rotated by manipulating the steering wheel, a plurality of gears which transmit a speed of rotation of the steering column, a plurality of link elements which transmit the operation of the gears to wheels of the vehicle, and more recently, a power steering system for assisting a driver's steering force manipulating the steering wheel to be applied to the steering system.

A power steering system provides a light and comfortable steering feeling when the vehicle travels at a low speed and provides excellent vehicle handling with a stable steering feeling when the vehicle travels at a high speeds. Types of power steering systems include hydraulic power steering which assists a steering force using hydraulic pressure generated by a pump, and electric power steering which assists a steering force using rotational power of a motor.

In general, power steering includes a pinion gear provided at an end portion of a steering column or pinion shaft and rotated by manipulation of a steering wheel, and a rack gear formed to extend in a width direction of a vehicle body between the vehicle wheels. The rack gear may be engaged with the pinion gear, and the pinion gear and the rack gear may be accommodated in a rack housing. A dust cap which prevents foreign matter from being introduced into the rack housing is mounted on an opening in the rack housing, through which the steering column passes, and a dust packing in close contact with the vehicle body, such as a dashboard, may be provided on the dust cap.

Some conventional dust caps are provided with a vent hole for discharging foreign matter, such as moisture, which flows downward along the steering column and flows into the inside of the dust cap or flows into the inside of the dust packing. However, there may be a problem where external foreign matter flows in through the vent hole intended to discharge the foreign matter. In addition, when the dust packing is deformed by an operation of the steering system, since air flow from the inside of the dust packing to the outside is required, foreign matter must be blocked from entering the dust packing while allowing air flow between the inside and the outside of the dust packing.

SUMMARY

Therefore, it is an aspect of the present disclosure to provide a dust cap for a steering system capable of preventing and suppressing introduction of external foreign matter such as dust and moisture.

It is an aspect of the present disclosure to provide a dust cap for a steering system capable of allowing a smooth air flow between the inside and the outside of the dust cap.

It is an aspect of the present disclosure to provide a dust cap for a steering system capable of allowing a dust packing to be easily deformed and preventing damage to the dust packing.

It is an aspect of the present disclosure to provide a dust cap for a steering system capable of smoothly discharging introduced dust or foreign matter.

It is an aspect of the present disclosure to provide a dust cap for a steering system capable of improving the durability of components provided in a steering system.

It is an aspect of the present disclosure to provide a dust cap for a steering system capable of allowing an air flow between the inside and the outside of the dust cap and preventing introduction of foreign matter using a simple structure.

In accordance with one aspect of the present disclosure, a dust cap for a steering system is considered, which is in some embodiments coupled to a housing accommodating a pinion gear provided on an end portion of a pinion shaft and a rack gear engaged with the pinion gear, where the dust cap includes a main body formed to provide an accommodation hole through which a shaft of the steering system passes; a bottom part disposed at an upper portion of the main body and configured to support a dust packing to be in close contact with a vehicle part; and a vent member inserted into an opening at the bottom part, wherein the vent member is shaped to define a vent hole providing communication between an inner space of the bottom part and an outside of the vent member; and a cross-sectional width of the vent hole gradually decreases along a downward direction.

In some embodiments, the vent member may include a body formed to define the vent hole therein; and a valve part provided at a lower end of the body.

In some embodiments, the valve part may include a pair of flaps opposing each other and configured such that a gap between respective interior walls of the pair of flaps gradually decreases along a downward direction; and a slit formed between respective lower ends of the pair of flaps.

In some embodiments, the vent member may further include a hook step extending laterally outward from an upper end of the body and configured to be supported by the bottom part.

In some embodiments, the vent hole may be configured to be in communication with an inside of the dust packing.

In some embodiments, the dust cap may further include a first rim formed to protrude upward along an outer edge of the bottom part; and a second rim formed to protrude upward from the bottom part around a circumference of the accommodation hole, wherein a mounting space is formed between the first rim and the second rim and the dust packing is mounted in the mounting space, and wherein the opening is provided at the bottom part corresponding to the mounting space.

In some embodiments, the dust cap may further include a plurality of openings and a corresponding plurality of vent members.

In some embodiments, the valve part may be disposed to protrude downward from a lower surface of the bottom part.

In some embodiments, the opening may be formed to pass through the bottom part along a vertical direction.

In some embodiments, the vent hole and the slit may be formed along the vertical direction.

In some embodiments, the vent member may be formed of an elastically deformable material.

In some embodiments, the dust cap may further include a fastening part provided at a lower end of the main body and configured to be coupled to a housing of the steering system.

In accordance with another aspect of the present disclosure, a dust cap for a steering system, which is in some embodiments coupled to a housing accommodating a pinion gear provided on an end portion of a pinion shaft and a rack gear engaged with the pinion gear, may include a main body formed to provide an accommodation hole through which a shaft of the steering system passes; a bottom part disposed at an upper portion of the main body and configured to support a dust packing to be in close contact with a vehicle part; and a vent member provided in an opening at the bottom part and configured to provide communication between an inside and an outside of the dust packing; wherein the vent member includes a pair of flaps configured such that a gap between respective interior walls of the pair of flaps gradually decreases along a downward direction.

In some embodiments, the pair of flaps may be formed of an elastically deformable material.

In some embodiments, the vent member may further include a slit formed between respective end portions of the pair of flaps; and a body shaped to define a vent hole configured to provide communication between the inside of the dust packing and the slit.

In some embodiments, the vent member may further include a hook step extending laterally outward from an upper end of the body and configured to be supported by the bottom part.

In some embodiments, the pair of flaps and the slit may be disposed to protrude downward from a lower surface of the bottom part.

In some embodiments, the dust cap may further include a first rim formed to protrude upward along an outer edge of the bottom part; and a second rim formed to protrude upward from the bottom part around a circumference of the accommodation hole, wherein a mounting space is formed between the first rim and the second rim and the dust packing is mounted in the mounting space, and wherein the opening is provided at the bottom part corresponding to the mounting space.

In some embodiments, the vent hole and the slit may be formed along a vertical direction so that foreign matter or moisture is discharged from inside the dust packing to the outside due to gravity.

In some embodiments, the dust cap may further include a fastening part provided at a lower end of the main body and configured to be coupled to a housing of the steering system.

DETAILED DESCRIPTION

Figure 1:
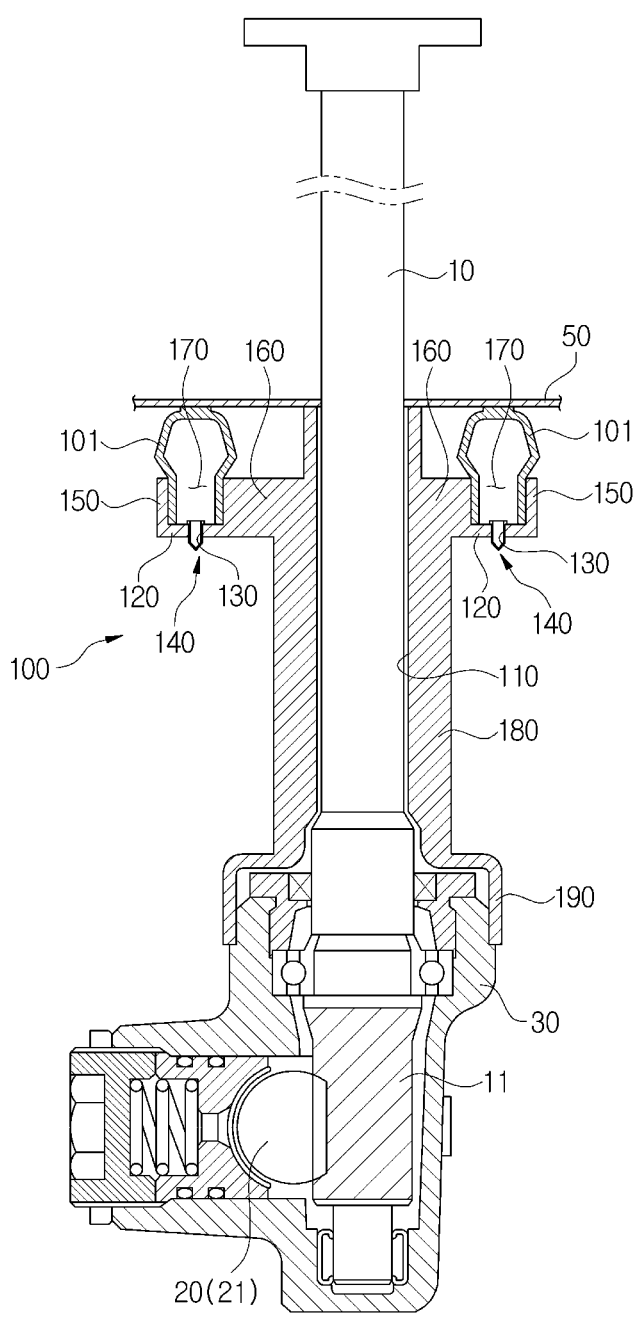
FIG. 1 is a cross-sectional view illustrating a steering system to which a dust cap is applied according to an embodiment of the present disclosure.

Hereinafter, embodiments of the present disclosure will be described in detail with reference to the accompanying drawings. The following embodiments are to provide the spirit of the present disclosure to those skilled in the art. The present disclosure is not limited to the embodiments disclosed herein and may be implemented in different forms. In the drawings, portions which are not related to the description may be omitted for clarifying the present disclosure, and sizes of components may be exaggerated for facilitating understanding of the present disclosure.

In the following description, with respect to constituent elements used in the following description, the suffixes "module" and "unit" are used only in consideration of facilitation of description. The "module" and "unit" are do not have mutually distinguished meanings or functions.

In addition, in the following description of the embodiments disclosed in the present specification, a detailed description of known functions and configurations incorporated herein will be omitted when the same may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents, and substitutions within the scope and sprit of the present disclosure.

It will be understood that the terms "first", "second", etc., may be used herein to describe various components. However, these components should not be limited by these terms. These terms are only used to distinguish one component from another component. As used herein, the singular form is intended to include the plural forms as well, unless the context clearly indicates otherwise.

FIG. 1 is a cross-sectional view illustrating a steering system to which a dust cap 100 is applied according to an embodiment of the present disclosure.

Referring to FIG. 1, the dust cap 100 according to the present embodiment may be mounted on a housing 30 of the steering system. The steering system includes a pinion shaft 10 rotated with a steering wheel (not shown) and provided with a pinion gear 11 provided on an outer circumferential surface of a lower end of the pinion shaft 10, a rack bar 20 formed to extend in a width direction of a vehicle body, so that two ends thereof are connected to the vehicle wheels, wherein the rack bar 20 is provided with a rack gear 21 engaged with the pinion gear 11, and a housing 30 accommodating the pinion gear 11 and the rack gear 21. When a driver steers the steering wheel, the pinion shaft 10 rotates, and the pinion gear 11 and the rack gear 21 are engaged with each other so that rotation of the pinion gear 11 is converted into linear motion of the rack bar 20, and thus steering the vehicle wheels.

The terms "upward" and "downward" described in the following discussion are based on the depiction of FIG. 1 and are not limited to specific directions, but should be understood as relative concepts to help understanding of the present disclosure.

The dust cap 100 according to an embodiment is provided to be coupled to the housing 30. The dust cap 100 is provided so that a main body 180, which will be described below, covers an outer circumferential surface of the pinion shaft 10 and may be coupled to an upper end of the housing 30 by a fastening part 190 provided on a lower side of the main body 180. In addition, a dust packing 101 is provided at an upper side of the main body 180, and an upper side of the dust packing 101 may be disposed to be in close contact with a part of a vehicle, such as a dashboard 50 of the vehicle, and a lower side of the dust packing 101 may be inserted into a mounting space 170 (which will be described) and coupled or mounted to the dust cap 100. The dust packing 101 may prevent external foreign matter such as dust and moisture from being introduced into the inside of the dust cap 100. However, in some configurations in the existing art, the dust packing 101 may be deformed while the vehicle travels or due to water pressure during vehicle washing, and thus foreign matter may be introduced.

Accordingly, the dust cap 100 according to embodiments of the present disclosure is provided to prevent introduction of foreign matter and to smoothly discharge any foreign matter which is introduced due to deformation of the dust packing 101.

Figure 2:
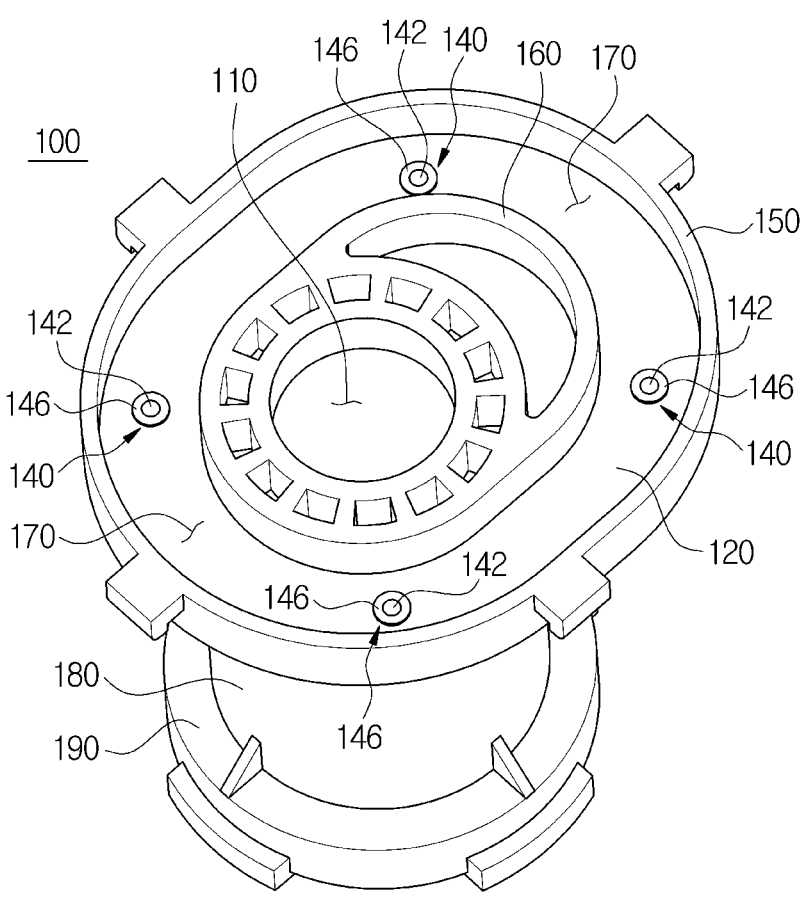
FIG. 2 is a perspective view illustrating the dust cap according to an embodiment of the present disclosure.
Figure 3:
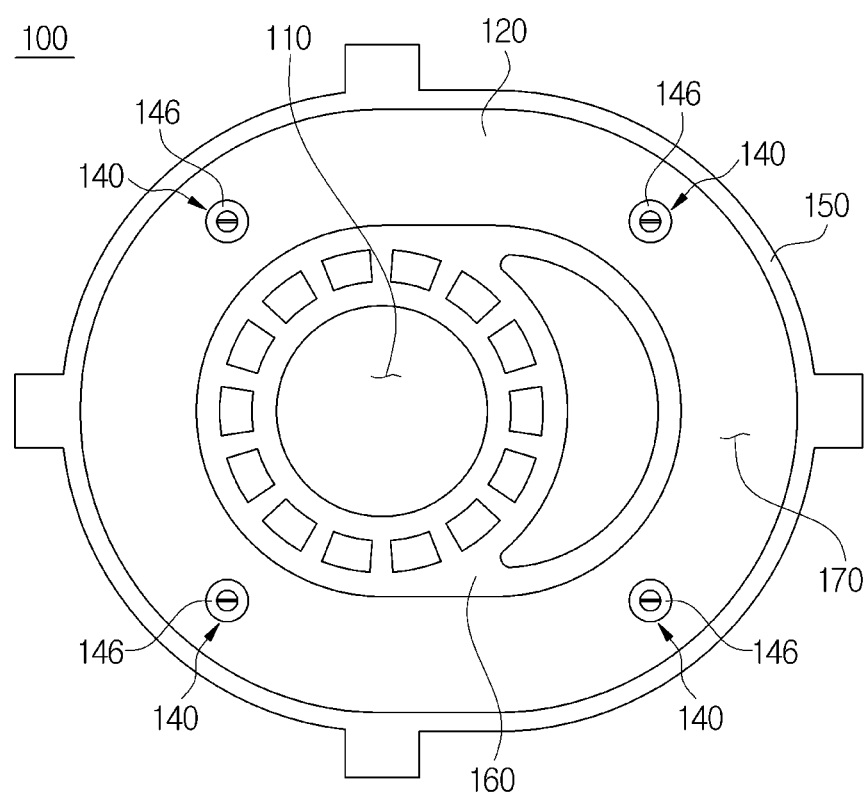
FIG. 3 is a plan view illustrating the dust cap according to an embodiment of the present disclosure.
Figure 4:
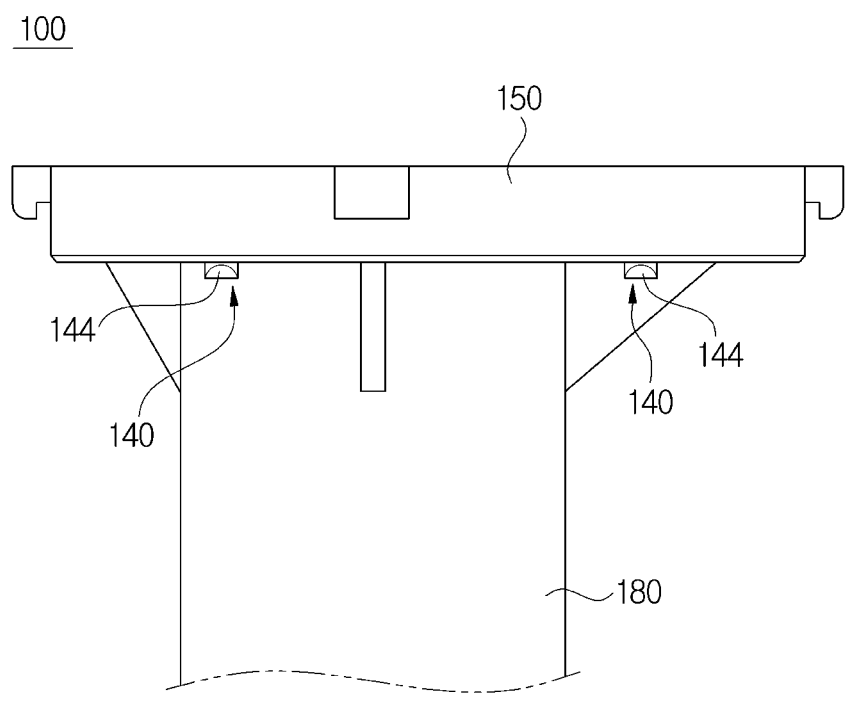
FIG. 4 is a side view illustrating the dust cap according to an embodiment of the present disclosure.

FIGS. 2 to 4 are a perspective view, a plan view, and a side view, respectively, each illustrating a dust cap 100 according to an embodiment of the present disclosure.

Referring to FIGS. 1 to 4, the dust cap 100 according to the present embodiment may be provided to include the main body 180 surrounding the outer circumferential surface of the pinion shaft 10, an accommodation hole 110 which is formed to pass through the main body 180 in an axial direction of the pinion shaft 10 and through which the pinion shaft 10 passes, a bottom part 120 on which the dust packing 101 is seated, an opening 130 formed to pass through the bottom part 120, a vent member 140 inserted into the opening 130, a first rim 150 formed to protrude upward along an edge of the bottom part 120, a second rim 160 formed to protrude upward along a circumference of the accommodation hole 110, and the fastening part 190 provided at a lower end of the main body 180 and configured to be coupled to the housing 30.

The main body 180 may be hollowly formed to extend in the axial direction of the pinion shaft 10 to surround the outer circumferential surface of the pinion shaft 10 such that the accommodation hole 110 accommodates the pinion shaft 10. A space in which the dust packing 101 is seated may be formed at an upper end of the main body 180. The bottom part 120 having the opening 130 may extend laterally outward and be configured such that the vent member 140 is inserted therein. The fastening part 190 for coupling the dust cap 100 to the housing 30 may be provided at the lower end of the main body 180.

The bottom part 120 may be formed to extend laterally outward from the upper end of the main body 180. The first rim 150 may protrude upward from the bottom part 120 at the outer edge of the bottom part 120, and the second rim 160 may be formed to protrude upward from the bottom part around the accommodation hole 110. A lower part of the dust packing 101 may be inserted and seated in a mounting space 170 formed between the first rim 150 and the second rim 160. The first rim 150 may form an outer wall of the mounting space 170 and may be integrally formed with the bottom part 120, for example by injection-molding. The second rim 160 may be provided along or around an outer circumference of the accommodation hole 110 to form a middle wall between the mounting space 170 and the accommodation hole 110. The second rim 160 may also be integrally formed with the bottom part 120, similar to the first rim 150, for example by injection-molding.

In some embodiments, although not illustrated in the drawings, a concave groove may be formed at the upper surface of the bottom part 120, for example near the second rim 160, so that moisture existing in a space between the dust packing 101 and the pinion shaft 10 gathers in the groove at the upper surface of the bottom part 120.

The opening 130 may be formed at the bottom part 120 laterally between the first rim 150 and the second rim 160. The opening 130 may be formed to pass through the bottom part 120 in a vertical direction so that moisture existing in the dust packing 101 or in the space between the dust packing 101 and the pinion shaft 10 may be downwardly discharged outside through the opening 130 due to gravity.

The opening 130 may be provided with the vent member 140 which smoothly discharges foreign matter outside and also prevents introduction of foreign matter.

Figure 5:
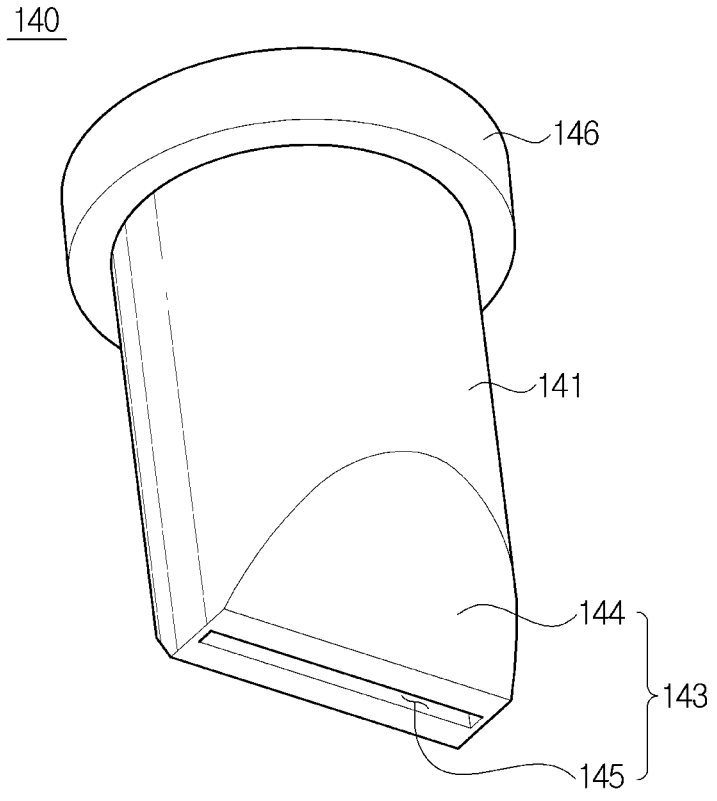
FIG. 5 is a perspective view illustrating a vent member according to an embodiment of the present disclosure.
Figure 6:
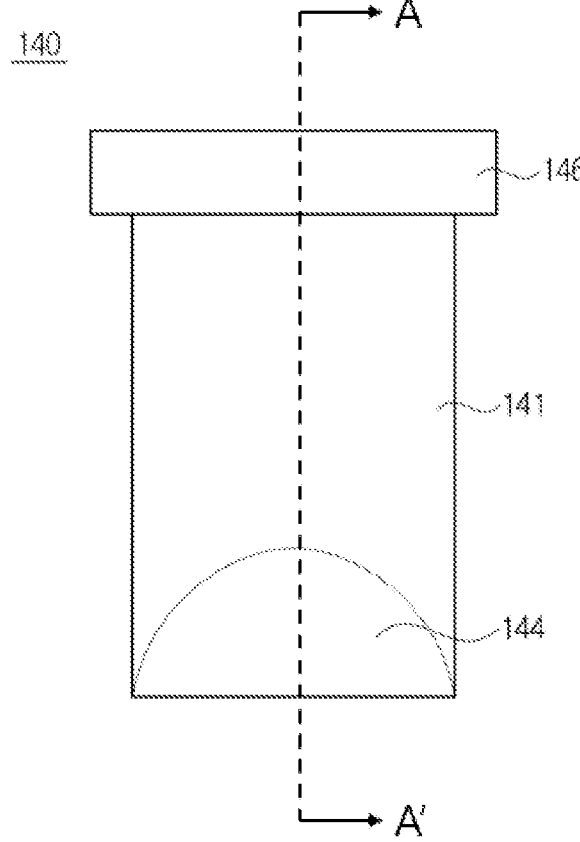
FIG. 6 is a side view illustrating the vent member according to an embodiment of the present disclosure.
Figure 7:
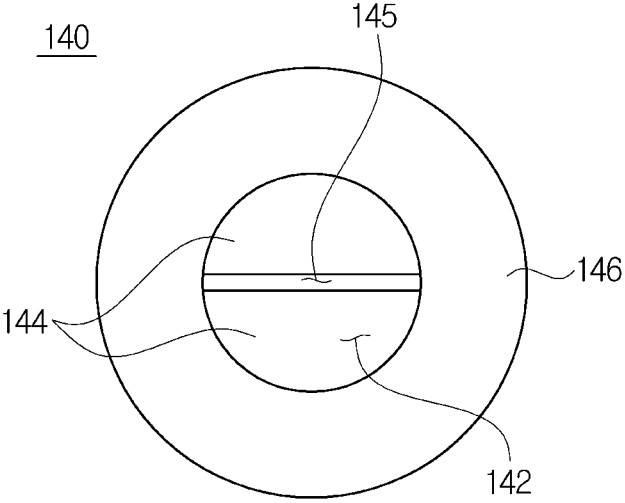
FIG. 7 is a plan view illustrating the vent member according to an embodiment of the present disclosure.
Figure 8:
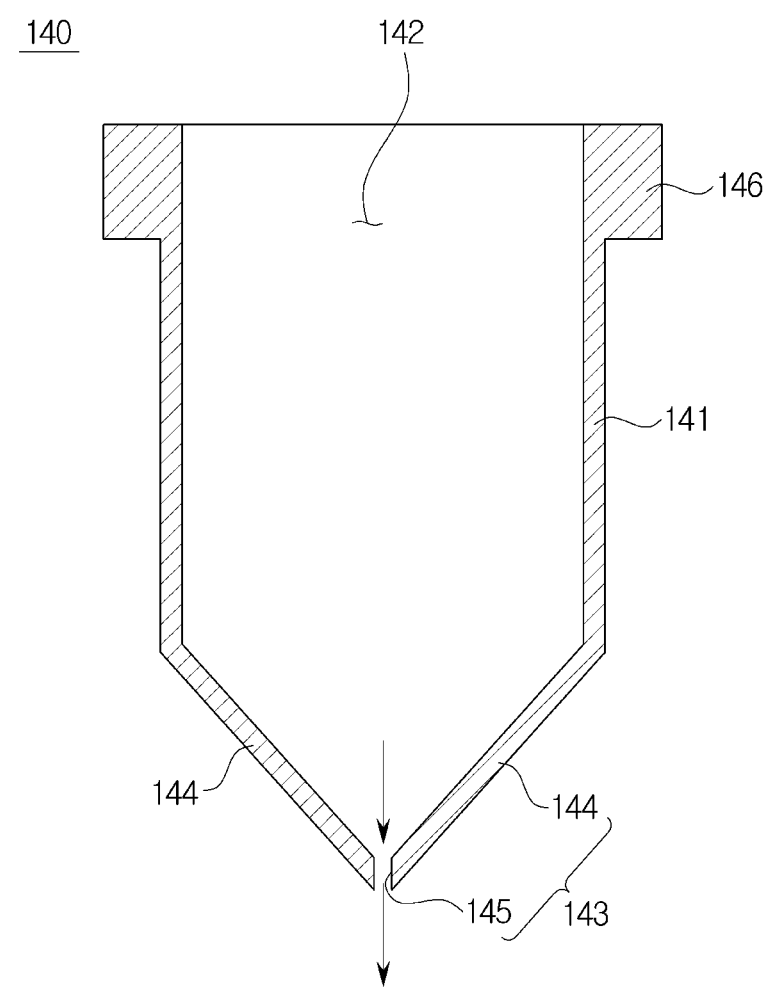
FIG. 8 is a cross-sectional view illustrating the vent member through which the inside communicates with the outside along line A-A' of FIG. 6.
Figure 9:
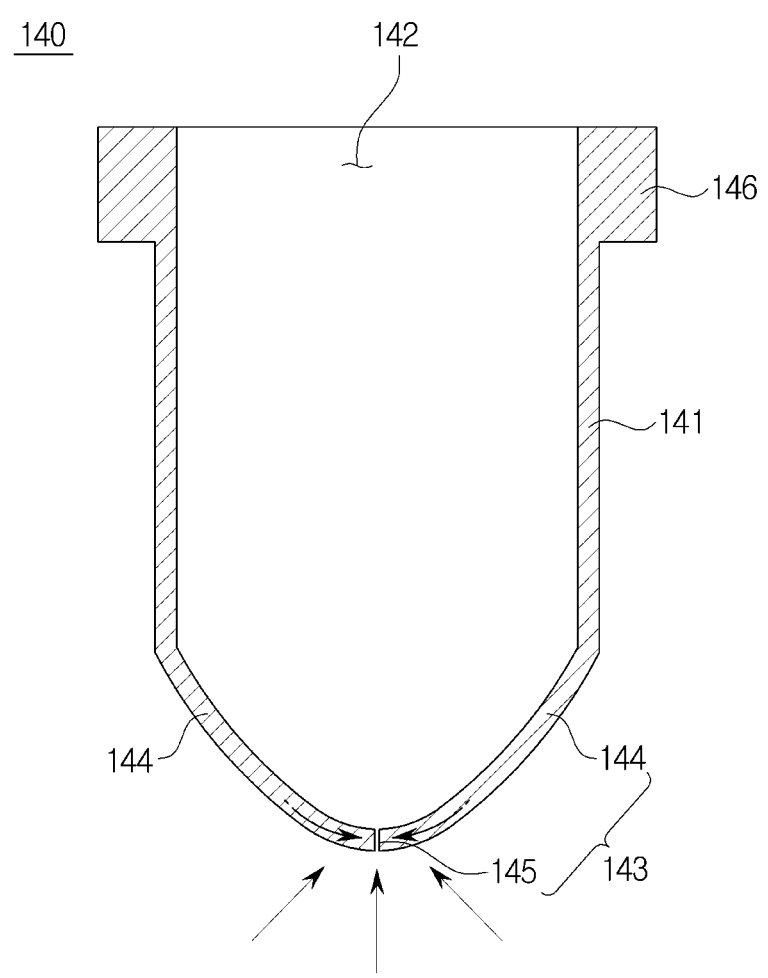
FIG. 9 is a cross-sectional view illustrating the vent member along line A-A' of FIG. 6 in a state in which a pair of flaps approach each other to reduce or close a slit when external foreign matter such as moisture is introduced, according to the embodiment.

FIGS. 5 to 7 are a perspective view, a side view, and a plan view, respectively, each illustrating the vent member 140 according to an embodiment of the present disclosure. In addition, FIGS. 8 and 9 are cross-sectional views illustrating embodiments of the vent member along line A-A' of FIG. 6 in various states of the vent member 140.

Referring to FIGS. 5 to 9, the vent member 140 is inserted into the opening 130 and may include a body 141 formed to be hollow to define a vent hole 142 therein, a valve part 143 provided at a lower end of the body 141, and a hook step 146 provided at an upper end of the body 141 and configured to engage and be supported by the bottom part 120. The vent member 140 may be formed of an elastically deformable material such as silicone or rubber, and the body 141, the valve part 143, and the hook step 146 may be integrally molded and manufactured.

The body 141 may be hollow to define the vent hole 142 along the vertical direction. The vent hole 142 may be formed in the vertical direction to be parallel to an aligned direction of the opening 130, or in a direction substantially corresponding thereto. An outer circumferential surface of the body 141 may be configured to be in close contact with an inner circumferential surface of the opening 130, thus preventing introduction of foreign matter into the inner space of the bottom part 120 such as air and moisture through a space between the outer circumferential surface of the body 141 and an inner circumferential surface of the opening 130.

The vent hole 142 may be in communication with an inner space of the bottom part 120. Thus, the inside of the dust packing 101 or the space between the dust packing 101 and the pinion shaft 10 may be in communication with the vent hole 142, and with a slit 145 of the valve part 143, which will be described below.

The hook step 146 may be provided at the upper end of the body 141. The hook step 146 may be formed to extend laterally outward from the upper end of the body 141, and a diameter of the outer surface of the hook step 146 may be larger than a diameter of the opening 130. Accordingly, a lower surface of the hook step 146 may engage and be supported by the upper surface of the bottom part 120, and thus the vent member 140 can be supported by and maintained in the opening 130.

The valve part 143 may be provided at the lower end of the body 141. The valve part 143 may include a pair of flaps 144 disposed to face each other and a slit 145 formed between respective lower ends of the pair of flaps 144. The pair of flaps 144 are formed to extend from the body 141 and may be formed so that a distance between respective interior surfaces of the flaps gradually decreases toward the slit. The slit 145 may be formed in the vertical direction or in a direction substantially corresponding thereto, similar to the vent hole 142, and a cross-sectional area of the slit 145 may be smaller than a cross-sectional area of the vent hole 142. Thus, the vent hole 142 formed inside the body 141 communicates with an interior space formed between the pair of flaps 144, and the cross-sectional area of the vent hole 142 may gradually decrease along a downward direction to form a duck bill shape at the slit 145.

The flaps 144 may be connected to the body 141, and the slit 145 through which the vent hole 142 communicates with the outside may be formed at the lower ends of the pair of flaps 144. The slit 145 may be in communication with the inside of the dust packing 101 through the vent hole 142, thus foreign matter such as air and moisture may be discharged from the inside of the dust packing 101 to the outside through the slit 145. Meanwhile, due to the shape of the pair of flaps 144 and the slit 145, the pair of flaps 144 may be elastically deformed to prevent and suppress introduction of foreign matter back into the slit. A detailed description thereof will be described below with reference to FIGS. 8 and 9.

The pair of flaps 144 and the slit 145 may be formed to protrude downward from the dust packing 101 and protrude downward from a lower surface of the bottom part 120. As the outer circumferential surface of the body 141 is in close contact with the inner circumferential surface of the opening 130, and the pair of flaps 144 and the slit 145 are exposed to the outside of the bottom part 120, a unidirectional flow is allowed in which foreign matter from the inside of the dust packing 101 is discharged outside, and introduction of foreign matter or moisture into the vent hole 142 or the inside of the dust packing 101 may be prevented.

The bottom part 120 may include a plurality of openings 130 and a plurality of vent members 140. For example, FIGS. 2 and 3 illustrate an embodiment having four sets of openings 130 and vent members 140, formed to be spaced apart from each other, but the present disclosure is not limited thereto, including the number of openings and vent members as well as their respective positions. It will be understood that this disclosure considers other embodiments having varying numbers and positions of the openings 130 and the vent members 140 to discharge foreign matter from the inside of the dust packing 101 and to effectively prevent introduction of foreign matter into the vent hole 142 and the inside of the dust packing 101.

Hereinafter, the operation of the dust cap 100 according to embodiments of the present disclosure will be described.

When the dust packing 101 is deformed due to vehicle washing or the like resulting in an increase of pressure inside the dust packing 101, a flow of the air and foreign matter from the dust packing 101, or from the space between the dust packing and the pinion shaft 10, passes outwardly from the vent hole 142 through the pair of flaps 144 to the outside. In this case, as the gap between the pair of flaps 144 is formed to become narrower downward and the pair of flaps 144 are spaced apart from each other to extend the slit 145, the air or foreign matter may be smoothly discharged even when foreign matter such as moisture flows downward along the vent hole 142 due to a weight of the foreign matter. Accordingly, the air or the foreign matter flowing to the outside from the inside of the dust packing 101 or the space between the dust packing 101 and the pinion shaft 10 through the vent hole 142 can be smoothly discharged (see FIG. 8).

Conversely, when external foreign matter such as moisture is introduced toward the slit 145 from the outside due to a vehicle wash, driving in the rain, a draft, or the like, the pair of flaps 144 may be pressed toward each other as the vent member 140 may be made of an elastically deformable material. Accordingly, the gap between the pair of flaps 144 becomes narrow, and the opening of the slit 145 may be reduced, or the slit 145 may be closed entirely. Thus introduction of foreign matter such as moisture into the dust packing 101 or the space between the dust packing 101 and the pinion shaft 10 can be reduced and prevented (see FIG. 9).

Therefore, the dust cap for a steering system according to embodiments of the present disclosure can prevent and suppress introduction of external foreign matter such as dust and moisture into the steering system.

The dust cap for a steering system according to embodiments of the present disclosure can allow smooth air flow from the inside to the outside.

The dust cap for a steering system according to embodiments of the present disclosure can allow the dust packing to be easily deformed and prevent damage to the dust packing.

The dust cap for a steering system according to embodiments of the present disclosure can smoothly discharge dust or foreign matter present inside the dust cap.

The dust cap for a steering system according to embodiments of the present disclosure can improve the durability of components provided in a steering system.

The dust cap for a steering system according to embodiments of the present disclosure can allow air flow from the inside to the outside and prevent introduction of foreign matter into the dust cap using a simple structure.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A dust cap for a steering system, the dust cap comprising:
   a main body formed to provide an accommodation hole through which a shaft of the steering system passes;
   a bottom part configured to support a dust packing to be in close contact with a vehicle part; and
   a vent member inserted into an opening at the bottom part, wherein:
   the vent member is shaped to define a vent hole providing communication between an inner space of the bottom part and an outside of the vent member; and
   a cross-sectional width of the vent hole gradually decreases along a downward direction toward the outside of the vent member.

2. The dust cap of claim 1, wherein the vent member includes:
   a body formed to define the vent hole therein; and
   a valve part provided at a lower end of the body.

3. The dust cap of claim 2, wherein the valve part includes:

a pair of flaps opposing each other and configured such that a gap between respective interior walls of the pair of flaps gradually decreases along a downward direction; and a slit formed between respective lower ends of the pair of flaps.

4. The dust cap of claim 3, wherein the vent member further includes a hook step extending laterally outward from an upper end of the body and configured to be supported by the bottom part.

5. The dust cap of claim 4, wherein the vent member is formed of an elastically deformable material.

6. The dust cap of claim 3, wherein the vent hole is configured to be in communication with an inside of the dust packing.

7. The dust cap of claim 3, further comprising:

a first rim formed to protrude upward along an outer edge of the bottom part; and a second rim formed to protrude upward from the bottom part around a circumference of the accommodation hole, wherein a mounting space is formed between the first rim and the second rim and the dust packing is mounted in the mounting space, and wherein the opening is provided at the bottom part corresponding to the mounting space.

8. The dust cap of claim 3, comprising a plurality of openings and a corresponding plurality of vent members.

9. The dust cap of claim 3, wherein the valve part is disposed to protrude downward from a lower surface of the bottom part.

10. The dust cap of claim 3, wherein the opening is formed to pass through the bottom part along a vertical direction.

11. The dust cap of claim 10, wherein the vent hole and the slit are formed along the vertical direction.

12. The dust cap of claim 3, further comprising:

a fastening part provided at a lower end of the main body and configured to be coupled to a housing of the steering system, wherein the bottom part of the dust cap is disposed at an upper portion of the main body.

13. A dust cap for a steering system, the dust cap comprising:

a main body formed to provide an accommodation hole through which a shaft of the steering system passes;

a bottom part configured to support a dust packing to be in close contact with a vehicle part; and a vent member provided in an opening at the bottom part and configured to provide communication between an inside and an outside of the dust packing;

wherein the vent member includes a pair of flaps configured such that a gap between respective interior walls of the pair of flaps gradually decreases along a downward direction.

14. The dust cap of claim 13, wherein the pair of flaps are formed of an elastically deformable material.

15. The dust cap of claim 14, wherein the vent member further includes:

a slit formed between respective end portions of the pair of flaps; and a body shaped to define a vent hole configured to provide communication between the inside of the dust packing and the slit.

16. The dust cap of claim 15, wherein the vent member further includes a hook step extending laterally outward from an upper end of the body and configured to be supported by the bottom part.

17. The dust cap of claim 15, wherein the pair of flaps and the slit are disposed to protrude downward from a lower surface of the bottom part.

18. The dust cap of claim 15, further comprising:

a first rim formed to protrude upward along an outer edge of the bottom part; and a second rim formed to protrude upward from the bottom part around a circumference of the accommodation hole, wherein a mounting space is formed between the first rim and the second rim and the dust packing is mounted in the mounting space, and wherein the opening is provided at the bottom part corresponding to the mounting space.

19. The dust cap of claim 18, wherein the vent hole and the slit are formed along a vertical direction so that foreign matter or moisture is discharged from inside the dust packing to the outside due to gravity.

20. The dust cap of claim 15, further comprising:

a fastening part provided at a lower end of the main body and configured to be coupled to a housing of the steering system, wherein the bottom part of the dust cap is disposed at an upper portion of the main body.

* * * * *